US010311108B2

(12) United States Patent
Chan et al.

(10) Patent No.: US 10,311,108 B2
(45) Date of Patent: Jun. 4, 2019

(54) CLOUD-BASED FILE PREFETCHING ON ELECTRONIC DEVICES

(71) Applicant: Razer (Asia-Pacific) Pte. Ltd., Singapore (SG)

(72) Inventors: Michael A. Chan, San Francisco, CA (US); Justin Quan, San Francisco, CA (US); Michael K. Fleming, San Francisco, CA (US)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 58 days.

(21) Appl. No.: 14/043,693

(22) Filed: Oct. 1, 2013

(65) Prior Publication Data

US 2014/0095591 A1 Apr. 3, 2014

Related U.S. Application Data

(60) Provisional application No. 61/708,794, filed on Oct. 2, 2012.

(51) Int. Cl.
*G06F 8/61* (2018.01)
*H04L 9/08* (2006.01)
(Continued)

(52) U.S. Cl.
CPC .............. *G06F 16/93* (2019.01); *G06F 8/62* (2013.01); *G06F 8/63* (2013.01); *G06F 9/4406* (2013.01); *G06F 9/4416* (2013.01); *G06F 16/11* (2019.01); *G06F 16/125* (2019.01); *G06F 16/13* (2019.01); *G06F 16/174* (2019.01); *G06F 16/182* (2019.01); *G06F 16/20* (2019.01); *H04L 9/0825* (2013.01); *H04L 9/3226* (2013.01); *H04L 43/04* (2013.01); *H04L 65/4069* (2013.01);
(Continued)

(58) Field of Classification Search
CPC ....... H04L 67/26; H04L 65/601; H04L 65/60; H04L 67/10; H04L 67/1095; H04W 12/08; G06F 8/62; G06F 9/4406; G06F 3/04883; G06F 17/30893; G06F 9/4416; G06F 8/63
USPC ...... 709/203, 217, 229, 213; 455/405, 67.11
See application file for complete search history.

(56) References Cited

U.S. PATENT DOCUMENTS 5,925,100 A 7/1999 Drewry et al.
6,085,226 A 7/2000 Horvitz
(Continued)

FOREIGN PATENT DOCUMENTS

CN 101692239 A 4/2010
WO 2013/137917 A1 9/2013

OTHER PUBLICATIONS

Co-Pending U.S. Appl. No. 14/248,219 of Chan, M.A. et al., filed Apr. 8, 2014.
(Continued)

*Primary Examiner* — David R Lazaro
*Assistant Examiner* — Zi Ye
(74) *Attorney, Agent, or Firm* — Mattingly & Malur, PC

(57) ABSTRACT

Techniques introduced here enable cloud-based file prefetching on electronic devices. The electronic devices store certain files on a remote storage server and preload some of the files locally to include file access efficiency. File access patterns on the electronic devices are analyzed collectively and efficiently using a cloud service to detect global access patterns and help determine which files to preload on each of the electronic devices.

21 Claims, 9 Drawing Sheets

(51) Int. Cl.

| | | |
|---|---|---|
| H04L 9/32 | (2006.01) | |
| H04W 8/24 | (2009.01) | |
| G06F 16/11 | (2019.01) | |
| G06F 16/13 | (2019.01) | |
| G06F 16/20 | (2019.01) | |
| G06F 16/93 | (2019.01) | |
| H04L 12/26 | (2006.01) | |
| H04L 29/06 | (2006.01) | |
| H04L 29/08 | (2006.01) | |
| G06F 16/174 | (2019.01) | |
| G06F 16/182 | (2019.01) | |
| G06F 9/4401 | (2018.01) | |

(52) U.S. Cl.
CPC .............. *H04L 65/60* (2013.01); *H04L 67/10* (2013.01); *H04L 67/1095* (2013.01); *H04L 67/1097* (2013.01); *H04L 67/2823* (2013.01); *H04L 67/2842* (2013.01); *H04L 67/40* (2013.01); *H04L 67/42* (2013.01); *H04W 8/24* (2013.01); *Y02D 10/45* (2018.01)

(56) References Cited

U.S. PATENT DOCUMENTS

| | | | |
|---|---|---|---|
| 6,286,080 | B1 | 9/2001 | Galbraith et al. |
| 6,385,641 | B1 | 5/2002 | Jiang et al. |
| 6,721,870 | B1 | 4/2004 | Yochai et al. |
| 6,757,696 | B2 | 6/2004 | Multer et al. |
| 6,877,065 | B2 | 4/2005 | Galbraith et al. |
| 6,918,113 | B2 | 7/2005 | Patel et al. |
| 6,959,320 | B2 | 10/2005 | Shah et al. |
| 7,043,524 | B2 | 5/2006 | Shah et al. |
| 7,062,567 | B2 | 6/2006 | Benitez et al. |
| 7,139,811 | B2 | 11/2006 | Lev Ran et al. |
| 7,155,465 | B2 | 12/2006 | Lee et al. |
| 7,222,186 | B2 | 5/2007 | Kobayashi |
| 7,260,672 | B2 | 8/2007 | Garney |
| 7,451,225 | B1 | 11/2008 | Todd et al. |
| 7,685,255 | B2 * | 3/2010 | Amlekar et al. .............. 709/217 |
| 7,792,792 | B2 | 9/2010 | Witriol et al. |
| 7,805,531 | B2 * | 9/2010 | Groll et al. .................... 709/229 |
| 8,019,811 | B1 | 9/2011 | Britto et al. |
| 8,136,089 | B2 | 3/2012 | Snodgrass et al. |
| 8,214,594 | B1 * | 7/2012 | Kneisley et al. .............. 711/118 |
| 8,386,425 | B1 | 2/2013 | Kadayam et al. |
| 8,438,298 | B2 | 5/2013 | Arai et al. |
| 8,456,972 | B2 | 6/2013 | Mehra et al. |
| 8,539,163 | B1 | 9/2013 | Sivasubramanian et al. |
| 8,566,788 | B2 | 10/2013 | Snodgrass et al. |
| 8,732,406 | B1 | 5/2014 | Pase et al. |
| 8,756,620 | B2 * | 6/2014 | Papish et al. ................... 725/14 |
| 8,769,210 | B2 | 7/2014 | Bell, Jr. et al. |
| 8,972,690 | B2 | 3/2015 | Horn et al. |
| 2002/0083183 | A1 | 6/2002 | Pujare et al. |
| 2002/0133537 | A1 | 9/2002 | Lau et al. |
| 2002/0184403 | A1 | 12/2002 | Dahlin et al. |
| 2003/0200282 | A1 | 10/2003 | Arnold et al. |
| 2005/0097268 | A1 | 5/2005 | Vollmer |
| 2006/0223495 | A1 * | 10/2006 | Cassett ................. H04L 43/026 455/405 |
| 2006/0277271 | A1 * | 12/2006 | Morse et al. .................. 709/217 |
| 2007/0067382 | A1 | 3/2007 | Sun |
| 2007/0078770 | A1 | 4/2007 | Hsieh |
| 2007/0195692 | A1 | 8/2007 | Hagglund et al. |
| 2007/0240065 | A1 | 10/2007 | Alperin et al. |
| 2007/0245110 | A1 | 10/2007 | Shibayama et al. |
| 2007/0288247 | A1 | 12/2007 | Mackay |
| 2008/0071988 | A1 | 3/2008 | Schloter et al. |
| 2008/0140997 | A1 | 6/2008 | Tripathi |
| 2008/0178298 | A1 | 7/2008 | Arai et al. |
| 2008/0183903 | A1 | 7/2008 | VanStee et al. |
| 2008/0250024 | A1 | 10/2008 | Kim et al. |
| 2008/0293488 | A1 | 11/2008 | Cheng et al. |
| 2009/0287842 | A1 | 11/2009 | Plamondon |
| 2010/0088369 | A1 | 4/2010 | Sebastian et al. |
| 2010/0115211 | A1 | 5/2010 | de la Iglesia et al. |
| 2010/0138613 | A1 | 6/2010 | Parker |
| 2010/0306652 | A1 | 12/2010 | Bolger et al. |
| 2010/0325199 | A1 | 12/2010 | Park et al. |
| 2011/0213994 | A1 | 9/2011 | Thereska et al. |
| 2011/0306304 | A1 * | 12/2011 | Forutanpour ....... G06F 3/04883 455/67.11 |
| 2011/0320558 | A1 | 12/2011 | Gross et al. |
| 2012/0078727 | A1 | 3/2012 | Lee |
| 2012/0084151 | A1 | 4/2012 | Kozak et al. |
| 2012/0084348 | A1 | 4/2012 | Lee et al. |
| 2012/0084349 | A1 | 4/2012 | Lee et al. |
| 2012/0094594 | A1 | 4/2012 | Rofougaran |
| 2012/0151000 | A1 * | 6/2012 | Snodgrass ......... G06F 17/30893 709/217 |
| 2012/0151255 | A1 | 6/2012 | Lee et al. |
| 2012/0246257 | A1 * | 9/2012 | Brown .............. G06F 17/30902 709/213 |
| 2013/0031204 | A1 | 1/2013 | Graham et al. |
| 2013/0067168 | A1 | 3/2013 | Havewala et al. |
| 2013/0185258 | A1 | 7/2013 | Bestler et al. |
| 2013/0210527 | A1 | 8/2013 | Kim et al. |
| 2013/0318306 | A1 | 11/2013 | Gonion |
| 2013/0330497 | A1 | 12/2013 | Villata |
| 2013/0339407 | A1 | 12/2013 | Sharpe et al. |
| 2014/0006538 | A1 * | 1/2014 | Oikonomou ........ H04L 67/2847 709/213 |
| 2014/0040346 | A1 | 2/2014 | Yanagihara et al. |
| 2014/0066176 | A1 | 3/2014 | LeTourneau et al. |
| 2014/0282636 | A1 * | 9/2014 | Petander .......... H04N 21/41407 725/1 |
| 2015/0208205 | A1 | 7/2015 | Chan et al. |
| 2015/0215816 | A1 * | 7/2015 | Abou-Elkheir ............................ H04N 21/25866 370/230 |
| 2015/0365491 | A1 | 12/2015 | Chan et al. |

OTHER PUBLICATIONS

Co-Pending U.S. Appl. No. 14/271,738 of Chan, M.A. et al., filed May 7, 2014.
Notice of Allowance dated May 5, 2014, for U.S. Appl. No. 14/171,679 by Chan, M.A. et al., filed Feb. 3, 2014.
Co-Pending U.S. Appl. No, 14/180,021, by Chan, M.A., et al., filed Feb. 13, 2014.
Notice of Allowance dated Mar. 31, 2014, for U.S. Appl. No. 14/155,067 by Chan, M.A. et al., filed Jan. 14, 2014.
Non-Final Office Action dated Apr. 4, 2014, for U.S. Appl. No. 14/171,679 by Chan, M.A. et al., filed Feb. 3, 2014.
Co-Pending U.S. Appl. No. 14/042,452 by Chan, M.A. et al., filed Sep. 30, 2013.
Co-Pending U.S. Appl. No. 14/043,082 by Chan, M.A. et al., filed Oct. 1, 2013.
Co-Pending U.S. Appl. No. 14/155,067 by Chan, M.A. et al., filed Jan. 14, 2014.
Co-Pending U.S. Appl. No. 14/171,679 by Chan, M.A. et al., filed Feb. 3, 2014.
International Search Report and Written Opinion dated Jan. 22, 2014, 10 pages, for International Application No. PCT/US2013/063003 filed Oct. 2, 2013.
Non-Final Office Action dated Jun. 16, 2014, for U.S. Appl. No. 14/180,021 of Chan, M.A. et al., filed Feb. 13, 2014.
Non-Final Office Action dated Oct. 9, 2014, for U.S. Appl. No. 14/271,738 of Chan, M.A. et al., filed May 7, 2014.
Final Office Action dated Dec. 5, 2014, for U.S. Appl. No. 14/180,021 of Chan, M.A. et al., filed Feb. 13, 2014.
Final Office Action dated Apr. 20, 2015, for U.S. Appl. No. 14/271,738 by Chan, M.A., et al., filed May 7, 2014.
Non-Final Office Action dated Aug. 10, 2015, for U.S. Appl. No. 14/180,021 by Chan, M.A., et al., filed Feb. 13, 2014.
Non-Final Office Action dated Sep. 25, 2015, for U.S. Appl. No. 14/042,452 by Chan, M.A., et al., filed Sep. 30, 2013.

(56) References Cited

OTHER PUBLICATIONS

Non-Final Office Action dated Nov. 25, 2015, for U.S. Appl. No. 14/271,738 by Chan, M.A., et al., filed May 7, 2014.
Non-Final Office Action dated Mar. 9, 2016, for U.S. Appl. No. 14/180,021 by Chan, M.A., et al., filed Feb. 13, 2014.
Non-Final Office Action dated Mar. 25, 2016, for U.S. Appl. No. 14/248,219, by Chan, M.A., et al., filed Apr. 8, 2014.
Final Office Action dated Jul. 18, 2016, for U.S. Appl. No. 14/042,452 by Chan, M.A., et al., filed Sep. 30, 2013.

* cited by examiner

| Name | Type | Size | Access Time | Access Type | Device Location |
|---|---|---|---|---|---|
| ThunderBird.exe | full computer application | 27M | 08/11/13, 07:15PM | read | 34N 40' 50.12" |
| Proposal.doc | application data | 0.5M | 09/01/13, 02:15AM | write | 56W 22' 43.08" |

*FIG. 4*

| Name | Type | Size | Access Type | Likelihood | Timeframe |
|---|---|---|---|---|---|
| Word.exe | full computer application | 15M | read | 80% | within a day |
| RainMan.wmv | application data | 50M | write | 45% | within a week |

*FIG. 5*

CLOUD-BASED FILE PREFETCHING ON ELECTRONIC DEVICES

PRIORITY CLAIM

This application claims to the benefit of U.S. Provisional Patent Application No. 61/708,794, entitled "CLOUD COMPUTING INTEGRATED OPERATING SYSTEM", which was filed on Oct. 2, 2012 and is incorporated by reference herein in its entirety.

FIELD OF THE INVENTION

At least one embodiment of the present invention pertains to cloud computing and file prefetching, and more particularly, to cloud-based file prefetching on electronic devices.

BACKGROUND

Today, people perform a large number of activities using a variety of electronic devices. For example, people watch videos on their desktops or play games on their cell phones. It would be helpful to ensure that when one is ready to perform an activity using an electronic device, the digital content necessary for performing the activity is available on the electronic device.

SUMMARY

Techniques introduced here enable cloud-based file prefetching on electronic devices. The electronic devices store certain files on a remote storage server and preload some of the files locally to include file access efficiency. File access patterns on the electronic devices are analyzed collectively and efficiently using a cloud service to detect global access patterns and help determine which files to preload on each of the electronic devices.

Using the access patterns, the cloud service can instruct the electronic devices to preload the files that have high probability to be used by the devices in future. Such increased hit rates for the cache of the preloaded files improve the file access efficiency and reduce data access lag for the electronic devices.

In accordance with the techniques introduced here, therefore, a method performed by a processor on a server that is connected to a plurality of client devices over networks is provided. The method receives a usage profile from one of the client devices. The usage profile contains access statistics of files that have been accessed by the client device. The method further analyzes usage profiles received from more than one of the client devices collectively to generate a prefetching profile for the client device. The prefetching profile specifies files that are likely to be accessed in the future by the client device. Then the method sends the prefetching profile to the client device.

In accordance with the techniques introduced here, therefore, another method for cloud-based file prefetching is also provided. The method sends a usage profile to the server. The usage profile contains access statistics of files that have been accessed by the client device. The method then receives a prefetching profile from the server. The prefetching profile specifies files that are likely to be accessed by the client device in the future based on a collective analysis of usage profiles sent by more than one of the client devices.

In accordance with the techniques introduced here, therefore, a method performed by a processor on a server that is connected to at least one client device over a network is also provided. The method receives usage profiles from a client device. Each of the usage profiles contains access statistics of files that have been accessed by one of multiple computer applications executed at the client device. The method then analyzes the usage profiles collectively to generate a prefetching profile for the client device. The prefetching profile specifies files that are likely to be accessed in the future by the client device. The method sends the prefetching profile to the client device so that the client device can prefetching files from a storage server based on the prefetching profile.

Alternatively, the server monitors the client device for specifics, e.g., storage size, storage usage, file access patterns, etc. Based on the monitored specifics, the server can send a strong indication to the client device instructing the client device to cache a particular set of files. The server can also send to the client device a caching priority set (e.g., as a file or a message). The caching priority set includes cache scores assigned by the server for each file of the client device. The client device can choose to prioritize prefetching the files based on the cache scores. The caching priority set can be unique per client device, per device class (e.g., a class of mobile phones, a class tablet computers, etc.), or per user account.

In accordance with the techniques introduced here, therefore, a client device connected to a server is also provided. The client includes a sending unit and a receiving unit. The sending unit sends a usage profile to the server. The usage profile contains access statistics of files that have been accessed by the client device. The receiving unit receives a prefetching profile from the server, wherein the prefetching profile specifies files that are likely to be accessed by the client device in the future based on a collective analysis of usage profiles sent by more than one of client devices connected to the server.

Other aspects of the technology introduced here will be apparent from the accompanying figures and from the detailed description which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

FIG. 4 contains a diagram illustrating an example usage profile maintained by a local profile manager.

FIG. 5 contains a diagram illustrating an example prefetching profile received by a local profile manager.

DETAILED DESCRIPTION

References in this specification to "an embodiment," "one embodiment," or the like, mean that the particular feature, structure, or characteristic being described is included in at least one embodiment of the present invention. Occurrences of such phrases in this specification do not all necessarily refer to the same embodiment, however.

Figure 1:
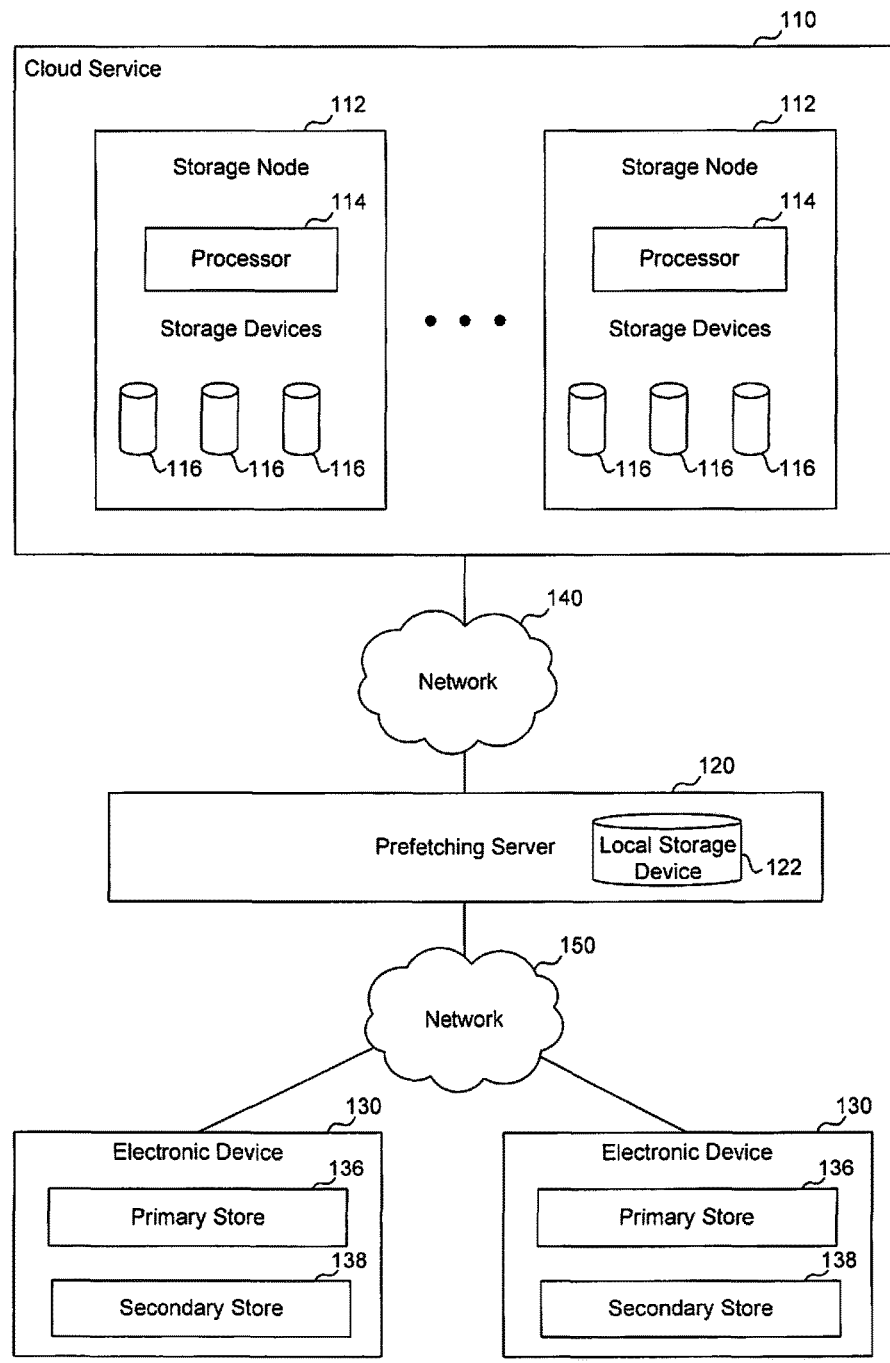
FIG. 1 contains a diagram illustrating an example environment in which cloud-based file prefetching on electronic devices can be carried out.

FIG. 1 contains a diagram illustrating an example environment in which cloud-based file prefetching on electronic devices can be carried out. In one embodiment, a cloud service 110 comprises a cluster having nodes 112 interconnected with each other by a network. Each of the nodes 112 contains one or more processors 114 and storage devices 116. The storage devices 116 can include optical disk storage, RAM, ROM, EEPROM, flash memory, phase change memory, magnetic cassettes, magnetic tapes, magnetic disk storage or any other computer storage medium which can be used to store the desired information.

In one embodiment, the cloud service 110 can store computer applications and application data used by electronic devices 130. The computer applications can include applications for general productivity and information retrieval, such as email, calendar, and applications in other categories, such as mobile games, GPS services, banking, and any other categories as contemplated by a person having ordinary skill in the art. The cloud service 110 can also store usage profiles and store prefetching profiles. Each usage profile characterizes activities performed by a user using one of the electronic devices 130 in terms of required files. Each prefetching profile specifies files to be prefetched on the electronic device in anticipation of the user performing activities which require the files. The cloud service 110 can be responsible for making sure that the metadata and the actual content data of the files are persistent in the client-server distributed storage system.

An electronic device 130 can be a desktop computer, a laptop computer, a tablet computer, an automobile computer, a game console, a smart phone, a personal digital assistant, or any other device capable of running computer applications. In one embodiment, the electronic device 130 includes one primary store 136 to store computer applications, the installation of which is typical or requested by the user, application data created or requested by the user, user data, usage profiles, prefetching profiles, meta-data, and so on. The electronic device 130 also includes a secondary store 138 to store additional computer applications and application data that are not yet available in the primary store 136 but are expected to be requested by the user in the near future. The primary and secondary stores can similarly be any computer storage medium which can be used to store desired information.

A prefetching server 120 can be any standalone apparatus or system which has sufficient network bandwidth, data capacity, computational resources, and so on. In one embodiment, a prefetching server 120 can include a local storage device 122 to store analytical algorithms to be applied to usage profiles. The local storage device 112 can similarly be any computer storage medium which can be used to store desired information. In an alternative embodiment, the prefetching server 120 does not include a local storage device. The metadata of the files can be stored in memory components of the prefetching server 120 or electronic devices 130. Each of the networks 140 may be a cellular network, a telephonic network, an open network, such as the Internet, a private network, such as an intranet and/or the extranet, or any other network known to a person having ordinary skill in the art.

Figure 2:
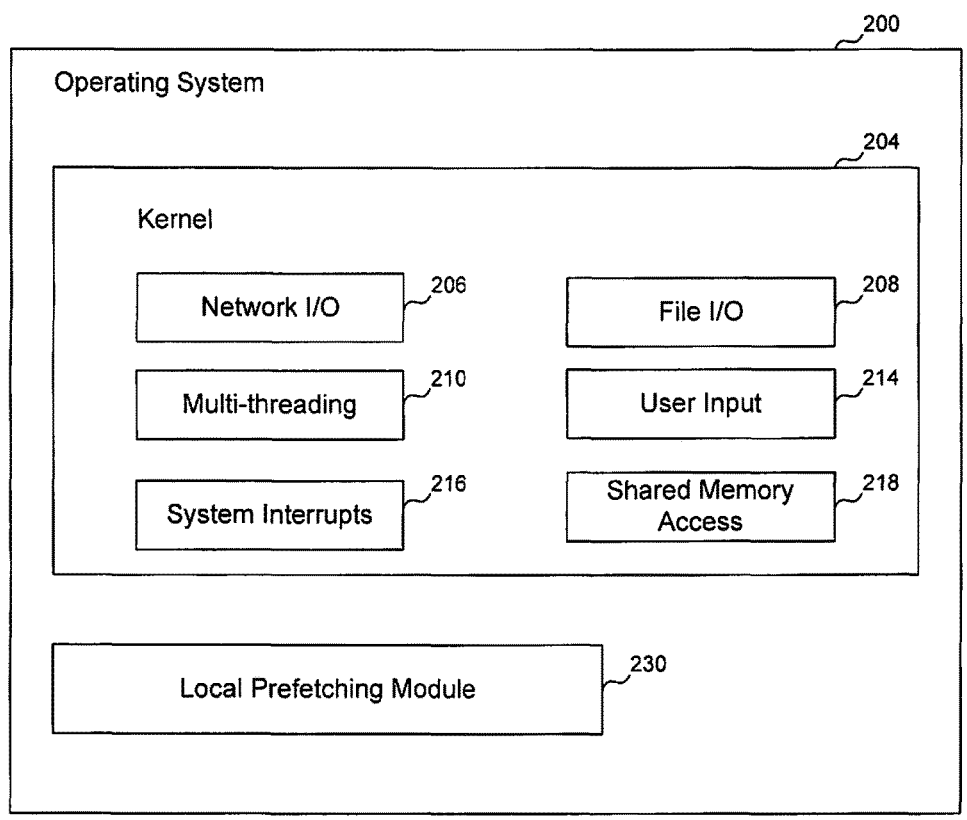
FIG. 2 contains a diagram illustrating an example operating system of an electronic device.

Each of the electronic devices hosts an operating system which includes a local prefetching module. FIG. 2 contains a diagram illustrating an example operating system 200. In one embodiment, the operating system 200 includes a kernel 204. The kernel 204 controls the computer applications running on top of the kernel 204. It provides interfaces to the hardware of the electronic device, thereby isolating the computer applications from the hardware. It may also include one or more intervening sources that can affect the execution of a computer application. For example, the kernel 204 may include a network I/O module 206, a file I/O module 208, a multi-threading module 210, a user input module 214, a system interrupts module 216, and a shared memory access module 218.

In one embodiment, the local prefetching module 230 also runs on top of the kernel 204. As one example, the local prefetching module 230 can run in a user space file system (e.g. FUSE) on top of a Linux kernel. As another example, the local prefetching module 230 runs in a kernel file system. Alternatively, the local prefetching module 230 can be implemented as part of a customized kernel 204.

Figure 3:
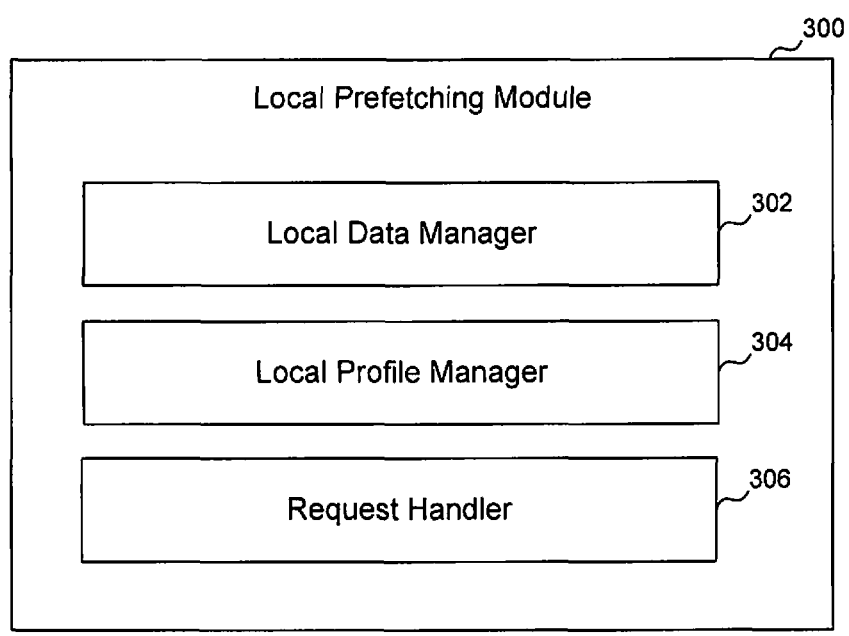
FIG. 3 contains a block diagram illustrating example components of a local prefetching module.

FIG. 3 contains a block diagram illustrating example components of a local prefetching module 300 for an electronic device. In one embodiment, the local prefetching module 300 includes a local data manager 302, a local profile manager 304 and a request handler 306.

In one embodiment, the local profile manager 304 maintains one or more usage profiles in the primary store and sends them to the prefetching server. It can send the usage profiles periodically, as soon as there is an update, in response to a request from the prefetching server, and so on. FIG. 4 contains a diagram illustrating an example usage profile. A usage profile can contain any information about the activities performed on the electronic device in terms of required files. In one embodiment, the usage profile contains any information on access to the files stored in the primary store. Such information can include the name of a file, the type of the file (partial computer application, full computer application, application data, etc.), the size of the file, the time of access to the file, the type of access (read, write, etc.), the location of the electronic device at the time of access, the identification of an application or process that accessed the file, and so on.

In one embodiment, the local profile manager 304 also receives prefetching profiles from the prefetching server and stores them in the primary store. It can also send requests to the prefetching server for the prefetching profiles periodically, when it has extra bandwidth available, and so on. FIG. 5 contains a diagram illustrating an example prefetching profile. A prefetching profile specifies files to be preloaded on an electronic device in anticipation of the user performing activities which require the files. For each of the specified files, information regarding the name, the type, the size, the access type, the likelihood that it is to be accessed within a predetermined timeframe, etc. can be included.

In one embodiment, the local prefetching module 300 can take the file access rights into account when the module 300 determines the files to be prefetched. For instance, a subset of files in one device can be only accessible by one application running on the device. The local prefetching module 300 can determine whether to prefetching any file from that subset based on the status of the application (e.g., stopped, running, sleeping, idling, etc.). There also can be file access rights depending on access statuses of other files. For instance, a file B is only accessible after file A is accessed; another file C is only accessible after file B is accessed. The local prefetching module 300 can determine that there is no need to prefetch file C if the file B has not been accessed, and that there is no need to prefetch files B and C if the file A has not been accessed.

In one embodiment, the local data manager 302 sends requests to the cloud service to retrieve specific computer applications or application data. It can also send requests to whichever separate servers are hosting the computer applications or application data. In addition, the local data manager 302 receives the requested computer applications or application data and stores them in the primary store or the secondary store on the electronic device. The pace of sending the requests and storing the requested computer applications or application data can depend on where the requested computer applications or application data are to be stored, When they are to be stored in the primary store on the electronic device, it generally means that they are to be accessed immediately and the sending and storing could be performed without much delay, while when they are to be stored in the secondary store, it generally means that they are likely to be accessed in the near future and the sending and storing can be performed with some flexibility in timing.

In one embodiment, given a prefetching profile, the local data manager 302 determines which requests for file retrieval to send and in what order. It may first filter the prefetching profile to remove any file that is already present in the primary store. Next, in one example, it may decide that requests are to be sent for all the files specified in the prefetching profile as the number of such files is small. In another example, it may decide that requests would first be sent for a predetermined number of files with the highest likelihoods or with the shortest time frames. On the other hand, when the size of the secondary store is limited, the local data manager 302 can enforce overwrite policies, such as cache algorithms known to someone of ordinary skill in the art.

In one embodiment, the request handler 306 accepts user requests for certain files and ultimately serves those files from the primary store. In general, it may first look in the primary store, which has pre installed or previously installed files. If the requested file is not there, it looks in the secondary store, which has prefetched files. It saves the requested file in the primary store before serving it in response to user requests.

Figure 6:
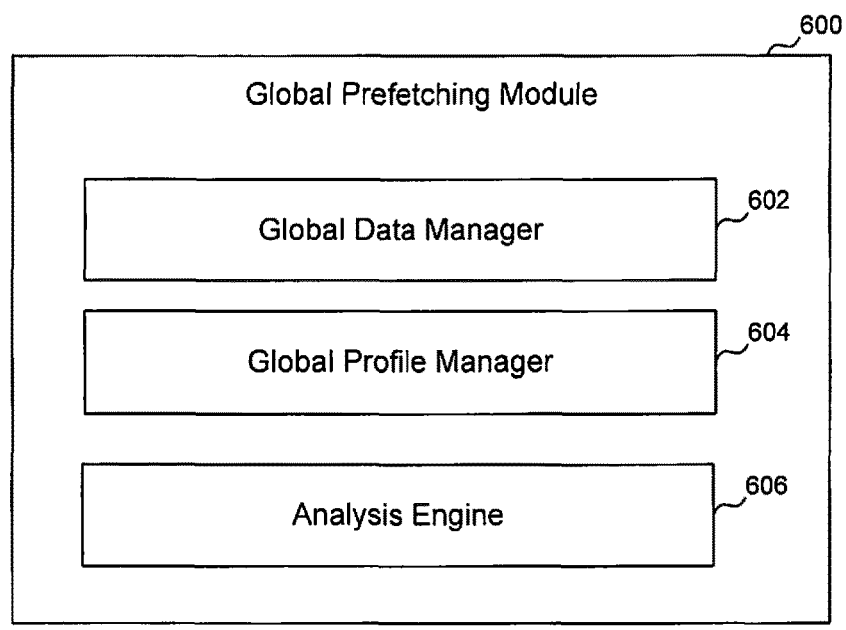
FIG. 6 contains a block diagram illustrating example components of a global prefetching module hosted by a prefetching server.

The prefetching server hosts a global prefetching module. FIG. 6 contains a block diagram illustrating example components of the global prefetching module 600. In one embodiment, the global prefetching module 600 includes a global data manager 602, a global profile manager 604 and an analysis engine 606.

In one embodiment, the global data manager 602 receives requests for computer applications or application data from the electronic devices and forwards them to the cloud service or other sources. The global data manager 602 also receives the requested computer applications or application data from the cloud service or other sources and forwards them to the electronic devices. The pace of forwarding the requests and the requested computer applications or application data can similarly depend on where the requested computer applications or application data are to be stored, as discussed above.

In one embodiment, the global profile manager 604 receives usage profiles from the electronic devices and forwards them to the cloud service for storage. It can forward a usage profile to the cloud service immediately upon receiving it from an electronic device. It can also forward the usage profiles received from an electronic device according to a preset schedule. In addition, it can forward the usage profiles received from multiple electronic devices in batches of a predetermined size or periodically. The global profile manager also maintains a global index of usage profiles in the local storage device indicating how to access the usage profiles stored with the cloud service.

In one embodiment, the global profile manager 604 also receives prefetching profiles from the cloud service and forwards them to the electronic devices. Similarly, it can forward a prefetching profile to the appropriate electronic device immediately or in response to a request from the electronic device for a prefetching profile. It can also wait to forward the prefetching profile together with a response to the next request from the electronic device, such as a request to retrieve certain computer application or application data. In addition, it can forward the prefetching profiles to one or more electronic devices according to a predetermined schedule.

In one embodiment, the analysis engine 606 manages analytical algorithms, the input to which are usage profiles and the output from which are prefetching profiles. Many types of analysis can be performed on the usage profiles, individually and collectively, to detect usage patterns. According to various embodiments, the usage profiles may indicate that on an electronic device, a computer application or a part thereof is often executed or a piece of application data is often used on a certain day or at a certain time, when the computer application or the piece of application data has a certain size, immediately before or after another computer application or piece of application data, when the electronic device is at a certain location, when another electronic device is connected to the prefetching server, etc. The lack of execution or use can also be incorporated into the usage patterns.

Some example usage patterns are described as follows. Different levels of a game may often be accessed in an increasing order. The last few very difficult levels may never be accessed, and the levels before the currently accessed levels may also never be accessed again. The photos or soundtracks in an album may often be accessed in the listed order. More recent albums may be accessed more frequently. Larger files may often be accessed on devices with better resources. Business-related files may often be accessed during the day or on an electronic device in the office, while files pertaining to entertainment may often be accessed at night or on an electronic device at home. Best-selling books in a city may be frequently accessed in that city and surrounding cities. Therefore, different files can be associated with different access patterns (as referred to as access statistics), which can be learned from the usage profiles without knowing the nature of the files.

In one embodiment, each analytical algorithm takes into consideration one or more of the usage patterns and selects a set of files for an electronic device that are likely to be accessed in the near future on the electronic device. It can assign different weights to different usage patterns. For example, it can prefer usage patterns reflecting more recent activities across electronic devices. It can also give more weight to usage patterns specific to the electronic device and/or those electronic devices owned by users similar to the owner of the electronic device. Furthermore, it can apply any classification, pattern-recognition and other techniques known to someone of ordinary skill in the art.

In one embodiment, the analysis engine 606 chooses one of the analytic algorithms, based on predetermined rules, user input, etc., and submits a request to the cloud service for executing the chosen analytic algorithm. In response, the cloud service executes the chosen analytic algorithm on the stored usage profiles in a distributed manner and generates resulting prefetching profiles for the electronic devices. The analysis engine 606 can submit a request as soon as a predetermined number of updated usage profiles are stored with the cloud service, according to a preset schedule, when the rate of file retrieval is high indicating a low degree of prefetching success, and so on.

Figure 7:
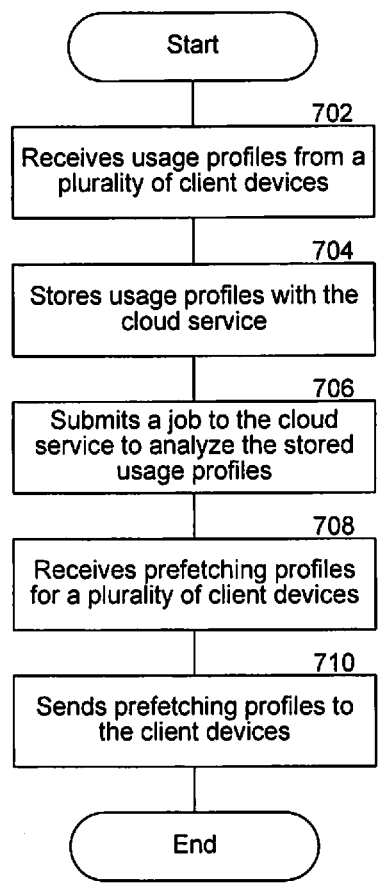
FIG. 7 contains a flowchart illustrating an example operation of a global profile manager of the global prefetching module.

FIG. 7 contains a flowchart illustrating an example operation of a global profile manager. In one embodiment, the global profile manager receives usage profiles from the electronic devices at step 702. It forwards the usage profiles to the cloud service for storage at step 704. Subsequently, the global profile manager submits a request to execute an analytical algorithm maintained by the analysis engine to the cloud service at step 706. When the execution is complete, the global profile manager receives prefetching profiles for the electronic devices at step 708. Finally, it forwards each of the prefetching profiles to the appropriate electronic device at step 710.

Figure 8:
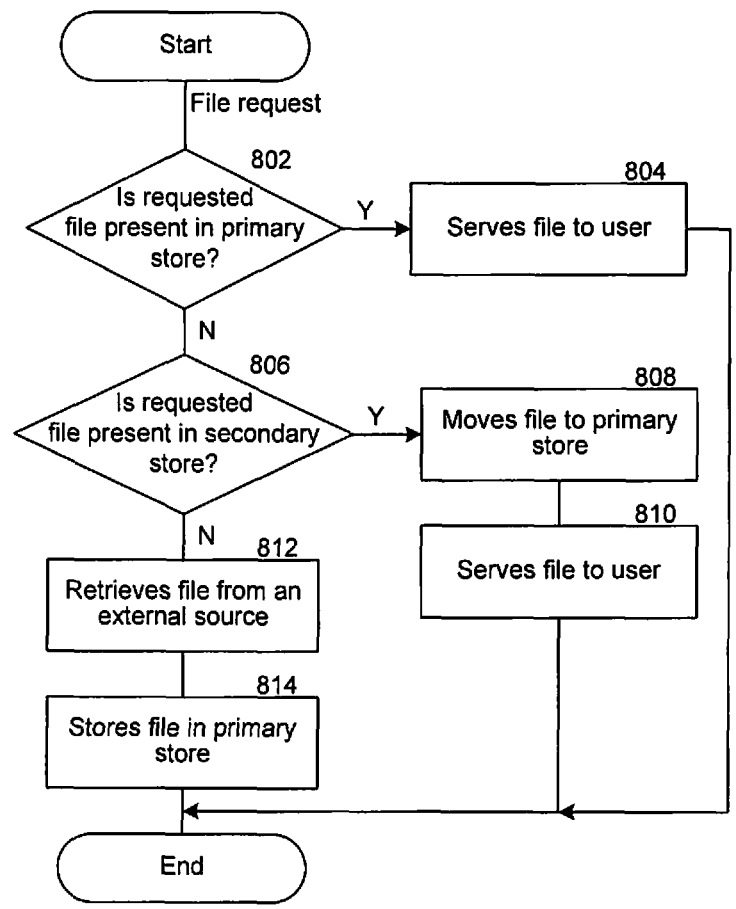
FIG. 8 contains a flowchart illustrating an example operation of the local prefetching module.

FIG. 8 contains a flowchart illustrating an example operation of a local prefetching module. In one embodiment, the request handler accepts a user request and determines whether a requested file is present in the primary store at step 802. If the file is present, it serves the file at step 804. If the file is not present, it determines whether the file is present in the secondary store at step 806. If the file is present, it moves the file to the primary store at step 808 and serves the file at step 810. If the file is not present, the local data manager retrieves the file from a source at step 712 and stores the retrieved file in the primary store at step 714.

Figure 9:
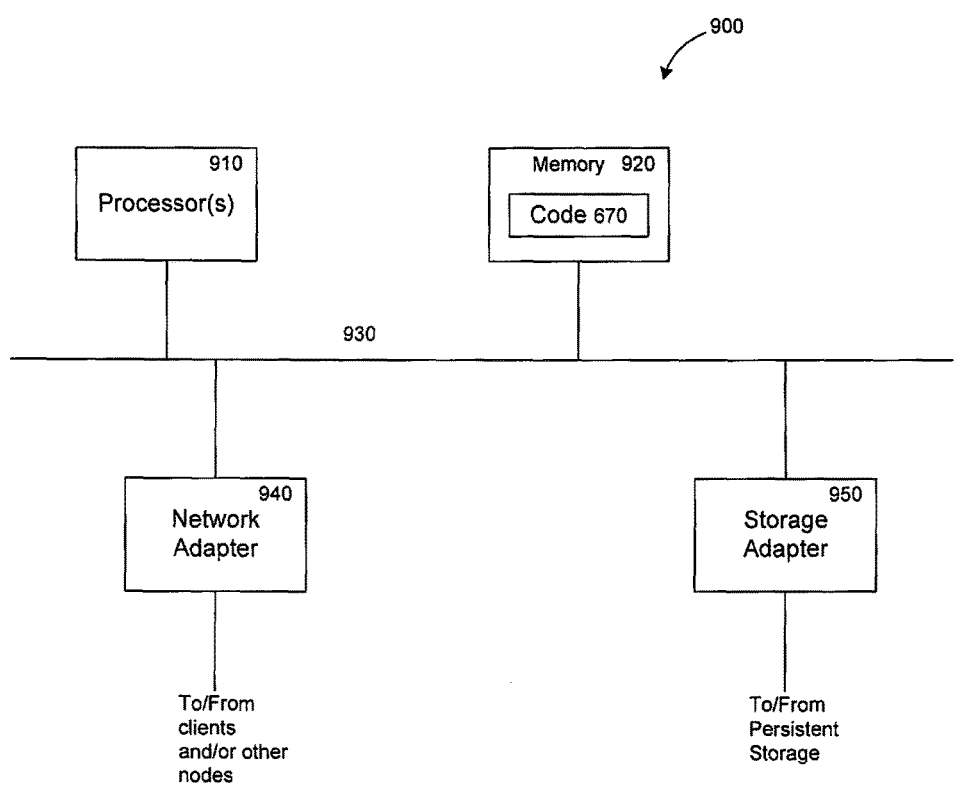
FIG. 9 contains a high-level block diagram showing an example architecture of a computer server, which may represent any computer described herein.

FIG. 9 contains a high-level block diagram showing an example architecture of a computer, which may represent any electronic device, any server, or any node within a cloud service as described herein. The computer 900 includes one or more processors 910 and memory 920 coupled to an interconnect 930. The interconnect 930 shown in FIG. 9 is an abstraction that represents any one or more separate physical buses, point to point connections, or both connected by appropriate bridges, adapters, or controllers. The interconnect 930, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 910 is/are the central processing unit (CPU) of the computer 900 and, thus, control the overall operation of the computer 900. In certain embodiments, the processor(s) 910 accomplish this by executing software or firmware stored in memory 920. The processor(s) 910 may be, or may include, one or more programmable general-purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or the like, or a combination of such devices.

The memory 920 is or includes the main memory of the computer 900. The memory 920 represents any form of random access memory (RAM), read-only memory (ROM), flash memory, or the like, or a combination of such devices. In use, the memory 920 may contain code 970 containing instructions according to the techniques disclosed herein.

Also connected to the processor(s) 910 through the interconnect 930 are a network adapter 940 and a storage adapter 950. The network adapter 940 provides the computer 900 with the ability to communicate with remote devices, over a network and may be, for example, an Ethernet adapter or Fibre Channel adapter. The network adapter 940 may also provide the computer 900 with the ability to communicate with other computers. The storage adapter 950 allows the computer 900 to access a persistent storage, and may be, for example, a Fibre Channel adapter or SCSI adapter.

The code 970 stored in memory 920 may be implemented as software and/or firmware to program the processor(s) 910 to carry out actions described above. In certain embodiments, such software or firmware may be initially provided to the computer 900 by downloading it from a remote system through the computer 900 (e.g., via network adapter 940).

The techniques introduced herein can be implemented by, for example, programmable circuitry (e.g., one or more microprocessors) programmed with software and/or firmware, or entirely in special-purpose hardwired circuitry, or in a combination of such forms. Software or firmware for use in implementing the techniques introduced here may be stored on a machine-readable storage medium and may be executed by one or more general-purpose or special-purpose programmable microprocessors.

A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed is:

1. A method performed by a processor on a server that is connectable to a plurality of client devices over a network, the method comprising:
receiving a usage profile from a first one of the client devices, wherein the usage profile includes access statistics of a plurality of applications or files at the first client device, wherein at least some of the plurality of applications or files are stored remotely from the first client device at a storage location over the network;
analyzing collectively a plurality of usage profiles received from the plurality of client devices, respectively, to determine a global access pattern based on the plurality of usage profiles;
generating a prefetching profile for the first client device based on the global access pattern, wherein the prefetching profile specifies at least a first application or file and a second application or file of the plurality of applications or files to prefetch from the storage location based at least partially on the first application or file and the second application or file being predicted to be accessed on the first client device and a sequence in which multiple applications or files of the plurality of applications or files were accessed on the first client device, wherein the prefetching profile specifies a first likelihood value of the first application or file being accessed within a first predetermined time period that starts from a present time and a second likelihood value of the second application or file being accessed within a second predetermined time period that starts from the present time, wherein the analyzing the usage profiles to generate the prefetching profile includes assigning a higher weight to more recent usage patterns determined across the plurality of client devices when generating the prefetching profile; and sending the prefetching profile to the first client device, wherein files are prefetched from the storage location to the first client device based on the prefetching profile.

2. The method of claim 1, wherein the server is further connected to a cloud-computing system, and wherein the analyzing comprises:

submitting the usage profile to the cloud-computing system for storage;

submitting a request to the cloud-computing system to collectively analyze the plurality of usage profiles received from the plurality of client devices; and receiving the prefetching profile from the cloud-computing system.

3. The method of claim 1, wherein:

the plurality of applications or files includes a plurality of applications; and the access statistics indicate a time at which individual applications of the plurality of applications were executed on the first client device.

4. The method of claim 3, wherein:

the usage profile contains access statistics of files of the plurality of applications that have been accessed by the individual applications of the plurality of applications executed at the first client device.

5. The method of claim 3, wherein:

the usage profile contains access statistics of a plurality of files that have been accessed by the individual applications of the plurality of applications executed at the first client device; and the analysis is based on a time distribution at which one or more of the files are accessed by one or more of the individual applications executed at the plurality of client devices.

6. The method of claim 1, wherein:

the plurality of applications or files includes a plurality of applications; and the access statistics indicate respective locations of the first client device when individual applications of the plurality of applications were executed at the first client device.

7. The method of claim 6, wherein the analysis is based on relative locations of multiple ones of the client devices when the individual applications of the plurality of applications were executed at the plurality of client devices.

8. The method of claim 6, wherein the analysis is based on a device location distribution of the respective locations at which the individual applications of the plurality of applications were executed at the plurality of client devices.

9. The method of claim 1, wherein the analyzing includes assigning different weights to the usage profile received from the first client device and usage profiles received from other client devices, in generating the prefetching profile for the first client device.

10. The method of claim 1, wherein:

the plurality of applications or files includes a plurality of applications and a plurality of files;

the usage profile contains access statistics of files of the plurality of files that have been accessed by respective applications of the plurality of applications or files at the first client device;

the prefetching profile specifies one or more files to prefetch from the storage location; and the prefetching profile indicates, for each of the specified files, a likelihood that the file will be accessed by at least one application on the first client device within a predetermined timeframe.

11. The method of claim 1, where the prefetching profile is sent in response to a request received from the first client device, wherein the request received from the first client device includes a request for at least one of a file or an application from the storage location.

12. The method of claim 1, wherein the prefetching profile is sent according to a predetermined schedule.

13. A method performed by a processor on a first one of a plurality of client devices connectable to a server over one or more networks, the method comprising:

sending a usage profile to the server, wherein the usage profile contains access statistics of a plurality of applications or files at the first client device, wherein at least some of the plurality of applications or files are stored remotely from the first client device at a storage location over the network; and receiving a prefetching profile from the server, wherein the prefetching profile is based on a global access pattern and specifies a first application or file and a second application or file, of the plurality of applications or files, to be preloaded from the storage location onto the first client device based on a likelihood of the first application or file and the second application or file being accessed at the first client device in the future and a sequence in which multiple applications or files of the plurality of applications or files were accessed on the first client device, wherein the prefetching profile specifies a first likelihood value of the first application or file being accessed within a first predetermined time period that starts from a present time and a second likelihood value of the second application or file being accessed within a second predetermined time period that starts from the present time, wherein the likelihood is based at least partially on a collective analysis of a plurality of usage profiles sent by the plurality of the client devices, respectively, to determine the global access pattern based on the plurality of usage profiles, wherein the collective analysis of the plurality of usage profiles includes assigning a higher weight to more recent usage patterns determined across the plurality of client devices when generating the prefetching profile based on the global access pattern; and prefetching files from the storage location based on the prefetching profile.

14. The method of claim 13, further comprising:

retrieving, from the storage location, the first application or file that is specified by the prefetching profile but not present in a first storage of the first client device; and storing the retrieved first application or file in a second storage of the first client device.

15. The method of claim 14, further comprising:

receiving a request to access the first application or file on the first client device;

determining whether the first application or file is in the first storage;

determining whether the first application or file is in the second storage based on determining that the first application or file is not in the first storage; and moving the first application or file from the second storage to the first storage based on determining that the first application or file is in the second storage.

16. The method of claim 15, further comprising:

retrieving the first application or file from the storage location based on determining that the first application or file is not in the second storage; and storing the retrieved first application or file in the first storage for immediate access.

17. The method of claim 13, wherein:

the prefetching profile includes a plurality of specified applications to prefetch from the storage location;

the prefetching profile indicates, for each of the specified applications, a likelihood that the specified application will be accessed within a predetermined timeframe based at least in part on a predicted execution timeframe of the specified application; and the retrieval of the specified applications is performed in order of likelihood.

18. A method performed by a processor of a computing device that is connectable to a client device over a network, the method comprising:

receiving a first usage profile from the client device, wherein the first usage profile contains access statistics of a plurality of applications or files that have been accessed at the client device, wherein at least some of the plurality of applications or files are stored remotely from the client device at a storage location over the network;

analyzing collectively a plurality of usage profiles received from a plurality of client devices, respectively, to determine a global access pattern based on the plurality of usage profiles;

generating a prefetching profile for the client device based on the global access pattern and the first usage profile, wherein the prefetching profile specifies a first application or file and a second application or file, of the plurality of applications or files, to be preloaded from the storage location onto the client device based on a likelihood of the first application or file and the second application or file being accessed in the future at the client device, wherein the prefetching profile specifies a first likelihood value of the first application or file being accessed within a first predetermined time period that starts from a present time and a second likelihood value of the second application or file being accessed within a second predetermined time period that starts from the present time, wherein the generating the prefetching profile comprises assigning a first weight to the first usage profile received from the client device and a second weight to the plurality of usage profiles received from the plurality of client devices used for determining the global access pattern, the first weight being different from the second weight;

sending the prefetching profile to the client device, wherein files are prefetched from the storage location to the client device based on the prefetching profile; and based on determining that a rate of application or file retrieval is higher than a threshold indicating of a low degree of prefetching success, initiating additional analysis of stored usage profiles to generate another prefetching profile.

19. A client device connectable to a server over a network, the client device comprising:

one or more processors; and a computer-readable medium maintaining instructions that, when executed by the one or more processors, program the one or more processors to:

send a first usage profile to the server, wherein the usage profile includes access statistics of a plurality of applications or files executed at the client device;

store at least some of the plurality applications or files at a storage location over the network; and receive a prefetching profile from the server, wherein the prefetching profile is based on a global access pattern and specifies a first application or file and a second application or file of the plurality of applications or files to be preloaded from the storage location onto the client device based on a likelihood of the first application or file and the second application or file being executed at the client device in the future, wherein the likelihood is based on a collective analysis of a plurality of usage profiles sent by a plurality of client devices, respectively, to the server to determine the global access pattern based on the plurality of usage profiles, wherein the prefetching profile specifies a first likelihood value of the first application or file being accessed within a first predetermined time period that starts from a present time and a second likelihood value of the second application or file being accessed within a second predetermined time period that starts from the present time, wherein the prefetching profile is generated by the collective analysis at least partially by assigning a first weight to the first usage profile received from the client device and a second weight to one or more other usage profiles received from one or more other client devices, the first weight being different from the second weight;

prefetch files from the storage location based on the prefetching profile; and based at least partially on a rate of application or file retrieval being higher than a threshold indicating of a low degree of prefetching success, receiving, from the server, another prefetching profile.

20. The client device of claim 19, wherein:

the client device comprises a mobile device having a first portion of the plurality of applications or files installed thereon; and a second portion of the plurality of applications or files are stored at the storage location.

21. The client device of claim 19, wherein the prefetching profile specifies the first application or file based on an order in which multiple applications or files of the plurality of applications or files were accessed on the client device.

* * * * *